United States Patent Office 3,769,217
Patented Oct. 30, 1973

3,769,217
EXTRACTIVE DISTILLATION WITH SUBSEQUENT LOWER PRESSURE ADIABATIC VAPORIZATION
Ralph R. Bannister and Gabriel W. Harris, Charleston, W. Va., and Joseph F. Boston, Manchester, Mo., assignors to Union Carbide Corporation
Continuation of abandoned application Ser. No. 804,375, Feb. 27, 1969. This application Apr. 5, 1971, Ser. No. 131,547
Int. Cl. C07c 7/08
U.S. Cl. 203—53
8 Claims

ABSTRACT OF THE DISCLOSURE

An improved process utilizing extractive distillation is employed for the separation of organic compounds having different degrees of polarity due for example, to different degrees of unsaturation. The extractive distillation is conducted by substituting, at least in part, pressure differentials for temperature as the driving force for the process. This concept is carried out by the use of at least one of (a) conducting the extractive distillation in at least two zones of different pressure, the pressure in each zone being selected so that the solubility of the solute in the solvent in one zone is substantially equal to the solubility of the solute in the solvent in the other zone, (b) partially removing the heavy components from the solvent in the bottom stream from the extractive distillation by an adiabatic vaporization prior to conventional solvent stripping, and (c) using the solvent-free heavy component as reboil vapors for the extractive distillation step.

---

This application is a continuation of Ser. No. 804,375 filed Feb. 27, 1969, now abandoned.

This invention relates to a novel method for effecting separations having as a major step an extractive distillation. More particularly, this invention is concerned with an improved extractive distillation method for separating organic compounds having different degrees of polarity due to different degrees of unsaturation or to the presence of polar substituents, such as hydroxyl groups, carbonyl groups, amino groups, thio groups, carboxyl groups and the like.

Extractive distillation is a well known technique for separating mixtures which, because the components to be separated form an azeotrope or have a low relative volatility over a wide composition range, are not readily separable by ordinary fractional distillation. In extractive distillation a relatively non-volatile solvent is fed to the distillation column in an amount sufficient to increase the relative volatility of the components to be separated and, thus, permit separation by distillation. Typical examples of commercially-employed extractive distillation systems are summarized in Table 1.

TABLE 1

Commercial extractive distillation operations [1]

| System: | Solvent |
|---|---|
| $HCl-H_2O$ | $H_2SO_4$. |
| $HNO_3-H_2O$ | $H_2SO_4$. |
| Ethanol-$H_2O$ | Glycerine. |
| Butene-butane | Acetone, furfural. |
| Butadiene-butene | Do. |
| Isoprene-pentane | Actone. |
| Toluene-paraffinic hydrocarbons | Phenol. |
| Acetone-methanol | $H_2O$. |

[1] Reproduced from C. S. Robinson et al., "Elements of Fractional Distillation," fourth ed., McGraw-Hill Book Company, Inc., New York (1950), at page 291.

For convenience, the following discussion will be directed toward the separation of a two-component feed. It is to be understood, however, that the principles to be discussed herein are also applicable to multi-component feed systems, i.e., feed systems containing more than two components, and that this invention is in no way restricted to the separation of a mixture of only two components.

In general, separation processes employing an extractive distillation comprise two basic steps. The first step is the extractive distillation step wherein the feed is distilled in contact with a solvent having a greater affinity for one of the two components. Normally, the solvent is a polar compound which more readily dissolves the more polar of the two feed components, thus rendering the more polar feed component less volatile than the less polar feed component. As employed herein, the term "heavy component" has reference to the less volatile, normally more polar, feed component, and the term "light component" has reference to the more volatile (less polar) feed component, regardless of molecular weight. The product streams from the extractive distillation step comprise an overhead stream comprising substantially solvent-free light component and a bottoms stream comprising a solution of substantially light component-free heavy component in the solvent.

In the second step of the conventional extractive distillation process, referred to herein as the solvent stripping step, the bottoms product from the extractive distillation is subjected to a fractional distillation or rectification to recover substantially solvent-free heavy component overhead and substantially heavy-component free solvent as a bottoms product. The solvent is then recycled to the extractive distillation step and the heavy component may be subjected to further refining techniques if desired.

This invention is concerned with improving the operation and economics of separations employing as a major step an extractive distillation. In the past, processes of this type have been designed and controlled on a temperature profile, i.e., the processes were designed with temperatures and, therefore, heat input being the primary design factor, and were run by considering only temperatures throughout the system. It has been found by this invention that an improved and more economical separation results if processes of this type are designed and conducted on a pressure profile wherein at least a portion of the extractive distillation process is conducted in stages of successively reduced pressure. The implementation of this concept is effected by three basic modifications of normal extractive distillation techniques. The first modification is in the extractive distillation step, the second is in the solvent stripping step and the third is in the nature, source and disposition of the reboil vapors for the extractive distillation step.

The improvements of this invention are more fully discussed below in conjunction with the accompanying drawings, of which.

Figures 1, 2, 3:
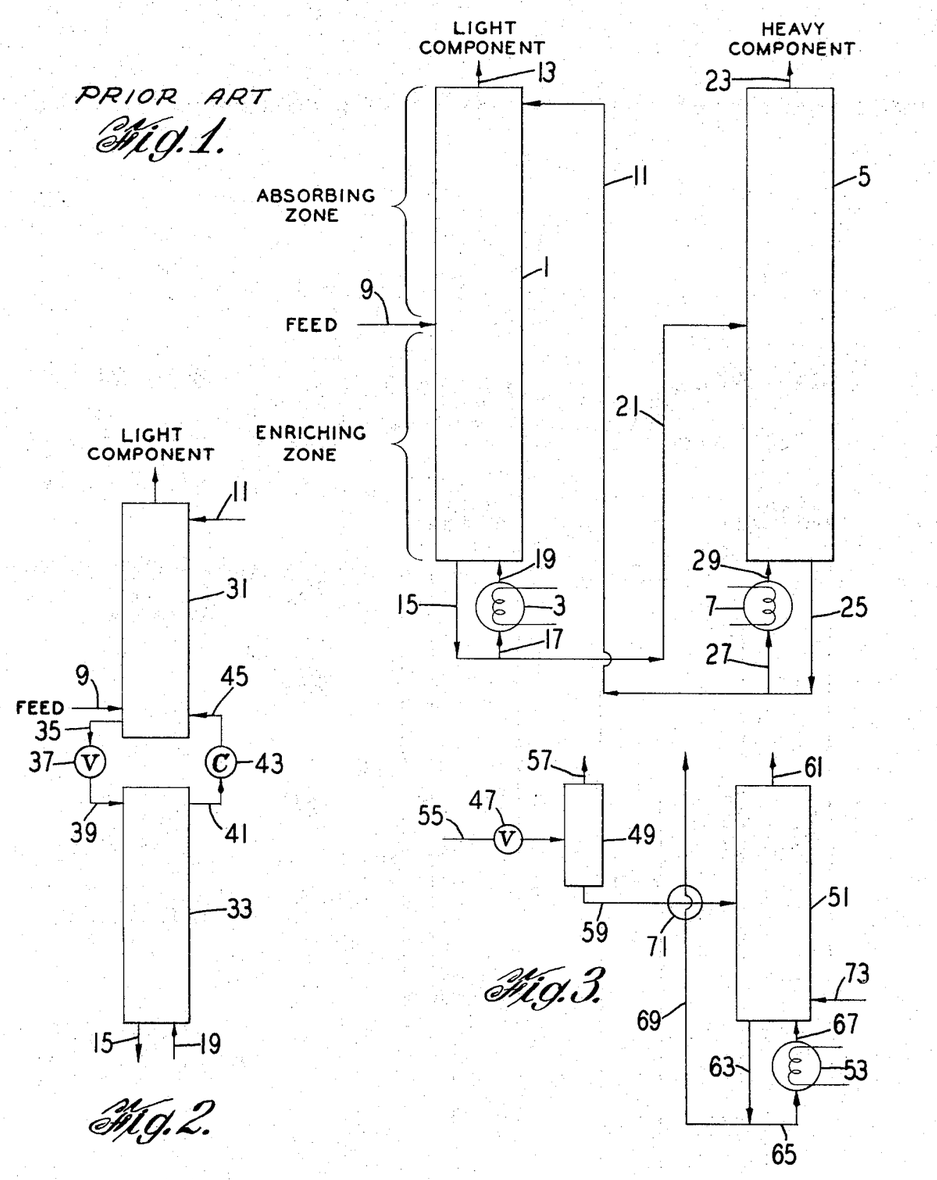
FIG. 1 is a schematic diagram of a conventional extractive distillation process.
FIG. 2 is a schematic diagram illustrating a modification of the extractive distillation step in accordance with this invention.
FIG. 3 is a schematic diagram illustrating a modification in the solvent stripping technique in accordance with this invention.

With reference to FIG. 1, the conventional method for effecting an extractive distillation involves the use of extractive distillation column 1 equipped with reboiler 3 and stripping or rectification column 5 equipped with reboiler 7. The mixture to be separated is fed through line 9 to extractive distillation column 1, where it is contacted with a solvent fed through line 11 to the top of column 1.

The ascending vapor stream in column 1 is progressively depleted in both solvent and the less volatile or "heavy" component and, at the top of column 1, is usually substantially heavy component-free. The descending liquid stream, on the other hand, is progressively depleted in the more volatile or light component and, at the bottom of column 1, is substantially free of the light component.

Column 1 can be considered as being composed of two portions or zones. The first or absorbing zone is that portion located above the point at which the feed is introduced wherein the "heavy component" is dissolved in or absorbed by the descending liquid solvent and the "light component" is removed from the solvent and passes overhead through line 13. The second or enriching zone is that portion of extractive distillation column 1 below the point at which the feed is introduced wherein the light component is stripped from the solvent by the ascending vapor stream and the descending liquid solvent is enriched in the heavy component.

The heavy component-solvent solution is withdrawn from extractive distillation column 1 through line 15, and a major portion is withdrawn through line 17 and vaporized in reboiler 3 to supply reboil vapors to column 1 through line 19. The balance of the heavy component-solvent solution is fed through line 21 to rectification column 5 wherein the heavy component is distilled out of the solvent and removed overhead through line 23. Solvent is removed from rectification column 5 through line 25 and a portion is fed through line 27 to reboiler 7 for vaporization and return to column 5 through line 29. The balance of the solvent is returned to the top of extractive distillation column 1 through line 11.

The first modification of this invention comprises conducting the extractive distillation step under conditions such that the pressure profile is the reverse of that normally employed. In a conventional extractive distillation step the pressure at the point of maximum concentration of heavy component and minimum concentration of light component, normally the bottom of the distillation column, is higher than the pressure at the point of maximum concentration of light component and minimum concentration of heavy component (the top of the distillation column). That is, the average pressure in the enriching zone is higher than the average pressure in the absorbing zone. It has been found by this invention, however, that a substantial improvement in process efficiency and economics is effected by reversing this pressure profile. This pressure reversal is effected by conducting the extractive distillation in at least two zones of different pressure, with the zone having the higher average concentration of light component having an average pressure which is greater than the average pressure in the zone having the lower concentration of light component.

FIG. 2 illustrates one embodiment for the implementation of this concept. In this embodiment the extractive distillation step is conducted in two separate steps, such as by the use of two columns, absorber 31, correponding to the absorbing zone of extractive distillation column 1 in FIG. 1, and enricher 33, corresponding to the enriching zone of extractive distillation column 1. The average pressure in absorber 31 is higher than the average pressure in enricher 33.

The feed will normally be introduced to this system at about the point in the extractive distillation at which the split is made, and usually to the bottom of absorber 31 as is shown in FIG. 2. This is not essential to this invention, however, and, depending upon the ratio of light to heavy components in the feed, it may be more advantageous to introduce the feed to the extractive distillation at some other point in the system, generally at a point where the ratio of light to heavy component in the column approximates that in the feed.

The liquid effluent from absorber 31, which contains solvent and both heavy and light components, is withdrawn through line 35, passed through pressure reducing valve 37 and fed to the top of enriched 33 through line 39. Vapors from the top of enricher 33, comprising solvent plus heavy and light components, are fed through line 41 to compressor 43, where they are compressed to the pressure of absorber 31, and then introduced to the bottom of absorber 31 through line 45.

The specific pressures in the two zones and the pressure differential between the two zones will obviously vary depending upon the stream being separated and the solvent employed to effect the separation. In general, the average pressure employed in absorber 31 will be at a value which is high enough to provide sufficient solvent capacity for the feed components to enable an economical separation, but not so high that the solvent's separating power is reduced by excessive feed concentration in the liquid phase. The optimum average absorber pressure for the separation of butenes from butadiene with a solvent consisting of an aqueous solution containing 50 to 60 mole percent N,N-dimethylacetamide is in the range of from about 60 to about 90 p.s.i.a.

The pressure differential between absorber 31 and enricher 33, like the absolute pressure value, will depend upon the particular system employed. It has been found, however, that the best results are obtained when the pressures in absorption zone 31 and enriching zone 33 are such that the solubility of the light component in the solvent ($S_L$), in moles of solute per moles of solvent, in absorber 31 is substantially equal to the solubility of the heavy component in the solvent ($S_H$) in enricher 33. By the term "substantially equal," as employed herein, it is meant that the value of $S_L$ in the absorber is in the range of from about 0.5 to about 2 times the value of $S_H$ in the enricher. For the butene-butadiene-aqueous N,N-dimethylacetamide system referred to above, optimum results are obtained where the average pressure in enricher 33 is about 50 to 75 percent of the average pressure in absorber 31.

The foregoing characterization of the required pressure differential is overly simplified, however, for it assumes substantially pure light component as the solute in the absorption zone and substantially pure heavy component as the solute in the enriching zone, a situation which does not exist even if a two-component feed is being separated, and is even less accurate in the case of the multicomponent feeds normally encountered in industrial practice. A more accurate criterion is that the solubility of the entire solute mixture in the solvent in the absorption zone should be substantially equal to the solubility of the entire solute mixture in the enriching zone. This requirement is generally attained when the maximum and minimum temperatures, and thus the temperature differentials, in each zone are substantially the same.

By operating in accordance with this modification, the temperature differential across the extractive distillation step is minimized and the maximum temperature obtained in this step is reduced. For example when butene is removed as the light component from its mixture with butadiene with an N,N-dimethylacetamide-water solution as the solvent in accordance with the prior art process the temperature varies from about 40° C. at the top of column 1 in FIG. 1 to about 70° C. at the bottom of column 1 under an average operating pressure of about 60 p.s.i.a. When the process of this invention is employed, however, and the average pressure in enricher 33 in FIG. 2 is reduced to about 40 p.s.i.a. while maintaining the average pressure in absorber 31 at about 60 p.s.i.a. to equalize the solubility of the butene-enriched hydrocarbon in absorber 31 and butadiene-enriched hydrocarbon in enricher 33, the temperatures in absorber 31 and in enricher 33 both vary from about 40° C. to 50° C. Thus, by operating in accordance with this invention, the temperature differential across the entire extractive distillation step is reduced from 30° C. to only 10° C. and the maximum temperature is reduced from 70° C. to only 50° C. This temperature reduction results in considerable savings in the amount of heat required to maintain a commercial-scale extractive distillation. Moreover, the reduced temperature reduces the rate of hydrolysis of the dimethylacetamide in the solvent to acetic acid, which, if present in small amounts, causes corrosion of process equipment. It also reduces solute polymerization and equipment fouling. Finally, lower temperatures improve solvent selectivity and capacity, thereby effecting economy in utilities and equipment.

Although the first modification of this invention has been illustrated with only two different zones, it is obvious that more than two zones can be employed. As a guide to the number of zones, it is generally preferred that the temperature differential across each zone be in the range of from about 5 to about 20° C., and most preferably about 8 to about 15° C. The essential requirement, however, is that, for any two adjacent zones in which a heavy component and a light component are being separated by extractive distillation with a solvent, the solubility of the solute in the solvent in each zone must be substantially equal to the solubility of the solute in the solvent in any other zone.

This first modification can be employed to advantage in any extractive distillation, such as the separation of acetylene and ethylene, butane and butene, butene and butadiene, vinylacetylene and butadiene, styrene and ethyl benzene, benezne and cyclohexane, butane and vinylchloride, and the like. It is most desirably employed, however, in extractive distillation systems in which the relative volatiilty of the components to be separated in solution in the selected solvent is at least 1.5 and preferably at least 3.

Illustrative systems are the trans-2-butene/1,3-butadiene/aqueous dimethylacetamide system wherein the relative volatility of trans-2-butene to 1,3-butadiene is about 1.6; the 1-butene/1,3-butadiene/aqueous dimethylacetamide system wherein the relative volatility of 1-butene to 1,3-butadiene is about 2; the butane/vinyl chloride/acetone system wherein the relative volatility of butane to vinyl chloride is about 2; the ethylbenzene/styrene/dimethylacetamide system wherein the relative volatility of ethylbenzene to styrene is about 2.5; the butane/1,3-butadiene/aqeous dimethylacetamide system wherein the relative volatility of butane to 1,3-butadiene is about 3; the 1,3-butadiene/vinylacetylene/aqueous dimethylacetamide system wherein the relative volatility of 1,3-butadiene to vinyl acetylene is about 3.3; and the ethylene/acetylene/acetone system wherein the relative volatility of ethylene to acetylene is about 10.

The second modification of this invention comprises continuing the decreasing pressure profile through the second step, i.e., the stripping step, of the extractive distillation process, and contemplates the use of pressures in the stripping step which are below those of the extractive distillation step. This modification is effected by removing a portion of the heavy component from the extractive distillation bottoms product by an adiabatic or flash vaporization step followed by essentially complete removal of the heavy component from the solvent by rectification. In a particularly preferred aspect of this modification the total pressure of the heavy component and solvent in the stripping column is reduced by the use of vacuum or an inert vapor. In the latter case, an inert vapor having a vapor pressure higher than the vapor pressure of the heavy component is employed to permit (a) compression, chilling and scrubbing of the stripper overhead to recover the heavy component or (b) compression of the stripper overhead and return as reboil to the enricher, with the inert vapor leaving the system with the overhead from the absorber.

A preferred embodiment for effecting this modification is shown in FIG. 3, in which the apparatus employed comprises pressure let-down valve 47, adiabatic vaporizer 49, and stripping column 51 equipped with reboiler 53.

The extractive distillation bottoms product is fed through line 55 to pressure let-down valve 47 and then to the adiabatic vaporizer 49 wherein a portion of the heavy component is vaporized by flashing at a pressure of one atmosphere or above. Substantially solvent-free heavy component vapors, which are recycled to the extractive distillation step, are removed overhead through line 57 and the liquid phase, comprising solvent and heavy component, is fed through line 59 to stripper 51. Product heavy component vapors, substantially free of solvent, are removed overhead from column 51 through line 61, and may be fed to a subsequent refining step, if desired. Substantially heavy-component-free solvent is removed from column 51 through line 63 and a portion of the solvent is withdrawn through line 65 and fed to reboiler 53 where the solvent is vaporized to supply reboil vapors to column 51 through line 67. The balance of the solvent is recycled to the extractive distillation step through line 69.

By operating in accordance with this modification, one effects an improvement in product purity and in process economy. For example, the adiabatic stripping step permits the at least partial removal of light components which were not removed by the extractive distillation, thereby reducing refining requirements for the product stream of line 61. This step, although beneficial to the separation of a two-component feed by extractive distillation techniques, is of special advantage when the original feed stream contains more than two components, such as that recovered from the conversion of butane or butene to butadiene. When feed streams of this nature are to be separated, it is impractical to operate the extractive distilseparation of a two-component feed by extractive distillation under conditions such that all undesirable components are separated from the desired components. Thus, when the heavy component from the extractive distillation is desired in a highly purified form it is always necessary to subject the overhead from the solvent stripping step to a final refining step. The removal of at least a portion of the lighter components by the adiabatic stripping step reduces the load on such a refining step.

In addition to providing a purer overhead product from column 51, the use of the adiabatic stripping step contributes to a more economical separation by reducing the heat load required for the distillation in column 51 by reducing the amount of solute in the solvent subjected to the distillation. Moreover, the solvent carryover with the heavy component is reduced and its loss or recovery cost minimized.

To obtain these advantages the conditions of the adiabatic stripping should be such that at least 10 and preferably at least 80 percent, but generally no more than 90 percent, of the solute present in the solvent stream from the extractive distillation is vaporized. The actual conditions of the flash vaporization obviously will vary depending upon the system employed. As an illustrative example, however, if the stream of line 55 comprises 16.5 mole percent solute hydrocarbon (93.0 mole percent butadiene, 3.8 mole percent vinylacetylene, 2.7 mole percent methylacetylene and 0.5 mole percent butene) and 83.5 mole percent of a 42 mole percent water/58 mole percent dimethylacetamide solution as the solvent at 65° C. and 3300 mm. Hg, about 30 percent of the hydrocarbon solute is vaporized by flashing adiabatically to 2300 mm. Hg, and about 50 percent of the hydrocarbon solute is vaporized by flashing to 1300 mm. Hg.

An additional important economic advantage is obtained by heat-exchanging the heavy-component-solvent effluent from the extractive distillation with the recycle heavy component-free solvent from distillation column 51. This heat exchange is preferably effected after the adiabatic stripping step, as is indicated by heat exchanger 71 in FIG. 3. By operating in this manner one further minimizes the heat load in column 51 by making maximum use of the heat contained by the solvent to warm the heavycomponent-solvent stream having a low concentration of heavy component.

In the second aspect of this second modification, reboiler 53 to column 51 is eliminated and, instead, a light, inert gas is fed to the bottom of column 51 through line 73, or the stripping distillation is effected under vacuum, thereby reducing the partial pressure of the solute-solvent mixture. The use of inert gas or vacuum in this manner to reduce the partial pressure of the desired heavy component is a further embodiment of the concept that a pressure profile rather than a temperature profile is a more economical way to execute an extractive distillation. Suitable gases include hydrogen, nitrogen, and paraffinic hydrocarbons of up to about 6 carbons. The amount of the inert gas or degree of vacuum is preferably at least that amount necessary to reduce the partial pressure of the heavy component in column 51 to a level at which no additional heat need be supplied to remove the heavy component from the solvent. It is also within the scope of this invention, however, that a combination of vacuum, reboil vapors and inert gas may be employed in conjunction with column 51.

The final modification of the process of this invention is in the selection of the reboil vapors for the extractive distillation. In the conventional extractive distillation process reboil vapors are obtained by the thermal vaporization of a portion of the bottoms product from the extractive distillation, and the reboil vapors contain a considerable quantity of solvent. Because the bottoms product is predominantly (generally at least 80 mole percent) relatively nonvolatile solvent, a large amount of heat is required to supply this reboil, particularly if the solvent is an aqueous or other medium having a high sensible heat. The final modification of the process of this invention contemplates the at least partial elimination of this heat load by employing as reboil vapors for the extractive distillation a substantially solvent-free, heavy-component-rich vapor stream, which may be obtained either from the overhead or bottoms streams recovered from the extractive distillation. Two sources for the reboil vapors have already been discussed with reference to the solvent stripping stages as conducted in accordance with this invention; viz, the adiabatic stripping step and the rectification step. The final source contemplates the utilization of a vapor stream obtained from some downstream refining technique which is necessary to the further purification of the light and/or heavy component separated by the extractive distillation.

It is axiomatic that the design of a refining scheme is determined on the basis of the most economical method of obtaining the desired purity of the product. That is, the sequence in which impurities are removed from the major product and the particular technique employed for each separation are correlated to achieve the desired product purity in the least expensive manner. Thus, a specific separation is so placed in a refining scheme to most economically remove one or more specific contaminants from the major product, leaving other impurities in the major product which are more economically separated in some later step. Similarly, a given technique, such as extractive distillation is employed to effect a specific separation when other techniques, such as distillation, adsorption, extraction and the like, cannot effect the desired separation in as economical a manner.

The third source of reboil vapors contemplates the use of extractive distillation to at least partially purify a crude major product followed by a subsequent refining of at least one of the streams, either vapor or liquid, recovered from the extractive distillation, which produces a solvent-free stream enriched in the heavy component, and recycle of at least a portion of that heavy-component-enriched stream to the extractive distillation as reboil vapors.

As an illustration, the overhead vapor stream from the separation of butenes from butadiene may contain some butadiene. If pure butenes are desired this stream must be further refined by removal of a butadiene-rich stream. Normally, this stream would be recycled to the extractive distillation in admixture with the feed. In accordance with this invention, this stream is fed to the extractive distillation in the form of reboil vapors.

In a more particular aspect, this third source of reboil vapors is concerned with a refining scheme in which the major product is a crude heavy component contaminated with a light component and a third component wherein the light component, but not the third component, is removed by an extractive distillation, and the third component is removed by subsequent refining of the heavy-component stream. In this context, the terms "major impurity" or "major contaminant," embrace that contaminant or impurity or group of contaminants or impurities which is intended to be removed, at least in part, from the major product by an extractive distillation, and the terms "minor impurity" or "minor contaminant" embrace that impurity or contaminant or group of impurities or contaminants which are to be removed from the major product by some subsequent refining technique.

This crude heavy component/light major contaminant/third minor contaminant system is exemplified by crude butadiene contaminated with about 15 percent combined butane and butenes and about 1 to 2 percent each of methylacetylene and vinylacetylene and employing an extractive distillation to remove both butane and butenes from the butadiene. In this system, since both butane and butenes can be removed economically in the same extractive distillation, their mixture is considered to be the "major contaminant." When the extractive distillation is operated at maximum efficiency for the separation of butane and butenes from the butadiene, neither of the vinyl- nor methylacetylene is removed to any substantial degree, and the butadiene overhead from the rectification in the solvent stripping stage contains about 2 percent of each of these compounds. To obtain polymer grade butadiene, these materials must be removed by suitable techniques, such as extractive distillation, distillation, extraction, absorption, selective reaction and the like. For example, the butadiene can be subjected to a first refining fractionation wherein a vapor overhead is obtained which contains essentially all of the methylacetylene fed to the first refining fractionation. In addition, this overhead comprises about 70–80 percent butadiene, which is desirably recycled to recover the butadiene. In accordance with this invention, the vapor stream is recycled to the extractive distillation to provide reboil vapors for that step. In this specific example it is preferred to remove the methylacetylene, for example by hydrogenation to propylene, extractive distillation or other means, prior to recycling to the extractive distillation, and thus ensure that the extractive distillation will operate at maximum efficiency for the butene-butadiene separation.

The bottoms product from this first refining fractionation comprises butadiene and essentially all of the vinylacetylene fed to the first refining fractionation, and thus generally must be subjected to a second refining fractionation wherein purified product butadiene is taken overhead. The bottoms product, containing about 70 percent butadiene, also contains essentially all of the vinylacetylene fed to the second refining fractionation, and, like the methylacetylene overhead from the first fractionation, is recycled to the extractive distillation as reboil vapors. Again, as in the case of the methylacetylene stream, this stream is preferably treated to remove vinylacetylene, for example by hydrogenation to butadiene, prior to recycling to the extractive distillation.

The foregoing scheme is not limited to the situation where the major product is the heavy component, but may also be applied with advantage to a system wherein the major product is the light component. To illustrate, assume a stream of butadiene containing vinylacetylene as a contaminant. In this case the major product, butadiene, is the light component and the impurity, vinylacetylene, is the heavy component. The overhead stream may contain some vinylacetylene, which can be removed by fractionation of the overhead to supply pure butadiene vapors and a liquid stream containing all of the vinylacetylene fed to the fractionation, as well as some butadiene. This heavy-component enriched stream is then vaporized and fed to the extractive distillation as reboil vapors. The bottoms from the extractive distillation, comprising vinylacetylene and solvent, is separated and a portion of the solvent-free vinylacetylene is also recycled as reboil vapors.

The combined use of extractive distillation for the removal of the major impurity followed by subsequent refining techniques to remove minor impurities with recycle of various off streams from the subsequent refining techniques achieves several important advantages, particularly in the purification of multicomponent streams, among them a reduction of the heat load in the extractive distillation and the recovery of desirable product. Further, it permits each separation to operate at maximum efficiency.

As is readily seen, the compositions of the reboil streams from these various sources will vary considerably. Although they can be combined prior to return, or all fed to a common point in the extractive distillation, it is preferred that each stream be fed to the extractive distillation column at that point at which the composition of each vapor reboil stream most closely approximates the composition of the vapor in the column. Thus, the vapor stream from the adiabatic stripper, which has a light key, will be fed to the extractive distillation at a relatively high point, whereas the heavier vapor stream from the rectification step in the solvent stripping stage will normally be the heaviest stream and is fed to the bottom of the extractive distillation. The vapors from subsequent refining steps will ordinarily be fed to a point intermediate the feed points for the vapors from the adiabatic stripping and the rectification.

The total amount of reboil vapors supplied to the extractive distillation step from these sources will vary, depending on the feed stream to be separated, the solvent employed and the desired degree of separation. For the separation of butenes from butadiene with aqueous, N,N-dimethylacetamide as the solvent to obtain less than about 0.5 mole percent butenes, based on butadiene, in the extractive distillation bottoms product, the total amount of solvent-free solute employed as reboil should be at least 70 mole percent, and preferably from 80 to 85 mole percent, of the amount of solute present in the extractive distillation bottoms.

Figure 4:
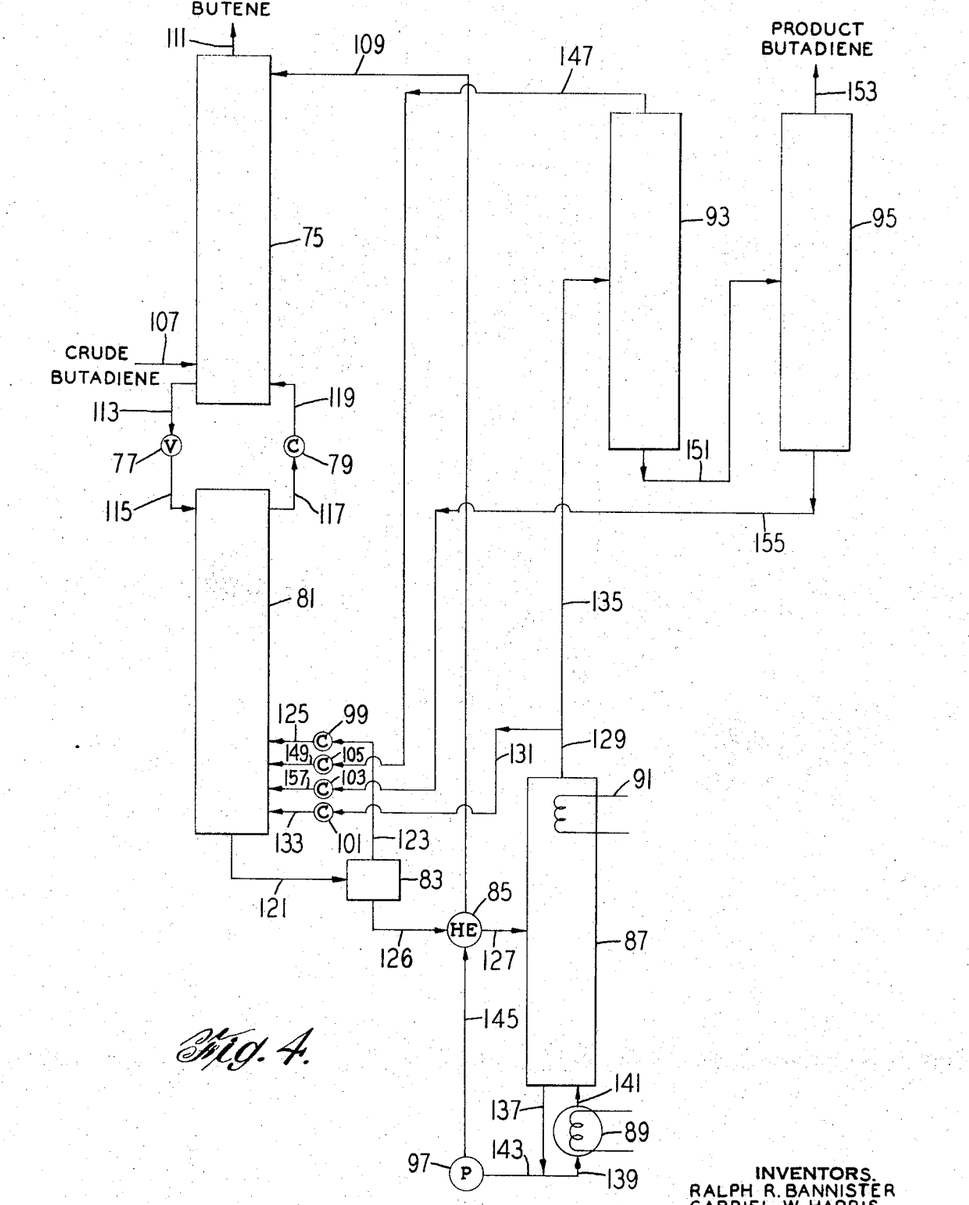
FIG. 4 is a schematic diagram illustrating the use of the modifications of this invention to purify 1,3-butadiene containing butenes as the main impurity.

FIG. 4 is an illustration of a preferred embodiment of the process of this invention for the purification of a crude 1,3-butadiene containing butenes as the major impurity together with small amounts of other hydrocarbons, including $C_3$ hydrocarbons, butane, methylacetylene as the minor impurity.

The apparatus employed essentially comprises absorber 75, pressure reducing valve 77, compressor 79, enricher 81, adiabatic stripper 83, heat exchanger 85, stripping rectification column 87 equipped with reboiler 89 and cooling coil 91, first refining column 93, second refining column 95, pump 97 and compressors 99, 101, 103 and 105. Crude butadiene is fed through line 107 to the bottom of absorber 75, which is at an average pressure of from 60 p.s.i.a. to about 90 p.s.i.a. The solvent, a solution of water and N,N-dimethylacetamide is fed to the top of absorber 75 through line 109. A first vapor stream comprising predominantly butenes, with some $C_3$ hydrocarbons, butane and butadiene is taken overhead from absorber 75 through line 111. A liquid stream containing solvent and the feed hydrocarbons is withdrawn from the bottom of absorber 75 and fed through line 113, pressure reducing valve 77, where the pressure is reduced by about 50 to about 75 percent, i.e., to about 30 to about 68 p.s.i.a., and then line 115 to the top of enricher 81. A vapor stream comprising solvent and hydrocarbons is removed from the top of enricher 81 through line 117, fed to compressor 79 and then through line 119 to the bottom of absorber 75. A liquid phase, comprising solvent, butadiene, and small amounts of $C_3$ hydrocarbons, butene, and vinyl acetylene, is withdrawn from the bottom of enricher 81 through line 121 and fed to adiabatic vaporizer 83, where the liquid stream is flashed by reducing the pressure from about 30 p.s.i.a. to slightly above atmospheric pressure. An overhead vapor stream comprising butadiene slightly enriched in $C_3$ hydrocarbons and butenes is taken overhead through line 123, compressed in compressor 99 and returned to the bottom of enricher 81 as reboil vapors through line 125. A liquid stream essentially comprising butadiene and solvent is withdrawn from vaporizer 83 through line 126 and passed through heat exchanger 85, where it is warmed by contact with hot solvent from stripping rectification column 87. The warmed butadiene-solvent solution is then fed through line 127 to column 87, which is operated at about or below the pressure of adiabatic vaporizer 83, but slightly above atmospheric pressure. Cooling coil 91 is employed in the top of column 87 to reflux any water removed from the solvent. This reflux prevents the loss of solvent with the stripped butadiene. A vapor stream comprising substantially solvent-free purified butadiene is removed from the top of column 87 through line 129. A portion of the butadiene stream is withdrawn through line 131, compressed in compressor 101 and fed through line 131 to absorber 81. The balance of the butadiene vapors are withdrawn through line 135 to first refining column 93. Substantially butadiene-free solvent is withdrawn from the bottom of column 87 through line 137, and a portion is fed through line 139 to reboiler 89 and returned to column 87 as reboil vapors through line 141. The balance of the solvent is fed through line 143 to pump 97, then through line 145 to heat exchanger 85 where the hot solvent is cooled by contact with cold butadiene-solvent solution. The cooled solvent is then returned to the top of absorber 75 through line 109.

The butadiene vapors fed to first refining column 93, which contain methylacetylene and vinylacetylene as the major impurities, are distilled and a vapor stream containing essentially all of the methylacetylene fed to column 93 is removed through line 147. After treatment to reduce the methylacetylene concentration by suitable means, not shown, such as hydrogenation, the vapors are fed to compressor 105 and then through line 149 to enricher 81. The bottoms product from first refining column 93 is withdrawn through line 151 and then fed to second refining column 95. Product butadiene is removed overhead from column 95 through line 153 and a liquid stream, containing essentially all of the vinylacetylene present in stream 135, is removed through line 155. After treatment for removal of vinylacetylene by means not shown and vaporization, this stream is fed to compressor 103 and then through line 157 to enricher 81.

The total amount of butadiene fed to enricher 81 through lines 125, 133, 149 and 157 is about 0.5 to about 0.9 mole per mole of butadiene withdrawn from enricher 81 through line 121.

The process of this invention, as described above, can be operated with still other modifications, if desired. For example, vapor effluents from the extractive distillation and solvent strippers will contain some solvent. Thus, to recover the solvent it is generally desirable either to wash the vapor effluent or partially condense the overhead for reflux above the point where the solvent-containing stream is fed to the column. Further, each of the processing steps conducted in single columns as shown in FIG. 4 can be conducted in more than one column in series.

Although this invention has been described with particular reference to the purification of butadiene containing butenes as the major impurity employing N,N-dimethylacetamide as the solvent, it can be applied to a wide variety of separations. For example, it is of general applicability to the separation of hydrocarbon streams containing two different compounds having different degrees of unsaturation. In systems of this nature, the more-saturated compound is the light component and the less-saturated compound is the heavy component. In the event of isomers having different types of unsaturation, for example an acetylenic compound and a diolefin, the acetylenic compound is more polar and, thus, the heavy component. Suitable hydrocarbons include both aliphatic, including cycloaliphatic, and aromatic hydrocarbon compounds of up to about 10 carbons. Hydrocarbon feed streams which are advantageously separated by the techniques of this invention are summarized in Table 2.

TABLE 2

| Light component: | Heavy component |
|---|---|
| Ethylene | Acetylene. |
| Propane | Propylene. |
| Propylene | Allene. |
| Allene | Methylacetylene. |
| Butene | Butadiene. |
| Butadiene | Vinylacetylene. |
| Pentene | Isoprene. |
| Ethylbenzene | Styrene. |
| Cyclohexane | Benzene. |
| $C_7$–$C_9$ paraffins | Benzene, toluene or xylene. |

Solvents which are useful for effecting hydrocarbon separations of this type include saturated ketones of up to about 5 carbons, such as acetone, methyl ethyl ketone and the like; saturated N,N-dimethylamides of up to about 5 carbons such as N,N-dimethylformamide, N,N-dimethylacetamide and the like; saturated nitriles of up to about 5 carbons such as acetonitrile and the like; di-β-chloroethyl ether; sulfolane; polyethylene glycols containing from 2 to 4 ethyleneoxy units of the formula $$\text{HO}-\left(\text{CH}_2\text{CH}_2\text{O}\right)_x-\text{H}$$

wherein $x$ is an integer having a value of from 2 to 4, for example triethylene glycol; and the like. In general, the ketones, amides, nitriles and di-chloroisopropyl ethers are preferred solvents for separating compounds based upon different degrees of aliphatic unsaturation, whereas sulfolane and the polyethylene glycols are preferred solvents for separating aromatic from aliphatic compounds.

The process of this invention is also of particular applicability in the purification of vinyl chloride contaminated with $C_4$ hydrocarbons such as butane, butenes, butadiene, and the like. In this instance, it is vinyl chloride which is the heavy component. Suitable solvents for effecting this separation are the saturated ketones and amides disclosed above, as well as saturated alcohols of up to about 5 carbons, such as methanol, ethanol and the like.

In all of the above-described systems, the recited solvent can be employed alone, or as an aqueous solution, containing up to about 80 mole percent water and 20 mole percent solvent, as has been illustrated in detail with the aqueous N,N-dimethylacetamide solvent system.

The following examples are further illustrative of the application of the principles of this invention.

EXAMPLE I

This example is illustrative of a commercial-scale butadiene purification process conducted in accordance with the system shown in FIG. 2.

Feed

Composition:
- $C_3$ Hydrocarbons, mol percent ______ 1.6
- n-Butane, mole percent ______ 1.8
- Butenes, mol percent ______ 16.1
- Vinyl acetylene, mol percent ______ 1.9
- 1,3-butadiene, mol percent ______ 78.6
- Feed rate, lb. mols/hour ______ 100

Solvent

Composition:
- N,N,-dimethylacetamide, mol percent ______ 70
- Water, mol percent ______ 30
- Feed rate, lb. mols/hour ______ 1292

Absorber overhead

Composition:
- $C_3$ hydrocarbons, mol percent ______ 2.94
- n-Butane, mol percent ______ 10.50
- Butenes, mol percent ______ 82.00
- 1,3-butadiene, mol percent ______ 4.56
- Rate, lb. mol/hour ______ 17.22

Solvent stripper overhead

Composition:
- $C_3$ hydrocarbons, mol percent ______ 1.33
- n-Butane, mol percent ______ --
- Butenes, mol percent ______ 2.37
- Vinyl acetylene, mol percent ______ 2.30
- 1,3-butadiene, mol percent ______ 94.00
- Rate, lb. mol/hour ______ 82.8

Pressures

Absorber:
- Top, p.s.i.a. ______ 80
- Bottom, p.s.i.a. ______ 85

Enricher:
- Top, p.s.i.a. ______ 40
- Bottom, p.s.i.a. ______ 45

Solvent stripper:
- Top, p.s.i.a. ______ 20
- Bottom, p.s.i.a. ______ 25

Temperatures

Absorber:
- Top, °C. ______ 40
- Bottom, °C. ______ 50

Enricher:
- Top, °C. ______ 40
- Bottom, °C. ______ 50

Solvent stripper:
- Top, °C. ______ 100
- Bottom °C. ______ 148

EXAMPLE II

This example is illustrative of a commercial-scale butadiene purification process conducted in accordance with the system shown in FIGS. 1 and 3.

Feed

Composition, mol percent:
- $C_3$ hydrocarbons ______ 4.6
- n-Butane ______ 13.0
- Butenes ______ 26.3
- 1,2-butadiene ______ 0.7
- Vinyl acetylene ______ 1.6
- 1,3-butadiene ______ 53.8
- Feed Rate, lb. mol/hour ______ 129.2

Solvent

Composition, mol percent:
- N,N-dimethylacetamide ______ 50
- Water ______ 50
- Feed Rate, lb. mol/hour ______ 1600

Extractive distillation column overhead

Composition, mol percent:
- $C_3$ hydrocarbons ______ 6.0
- n-Butane ______ 31.6
- Butenes ______ 61.0
- 1,3-butadiene ______ 1.3
- Rate, lb. mol/hour ______ 53.1

Extractive distillation column bottoms

Composition, mol percent:
N,N-dimethylacetamide _______________ 41.3
Water ____________________________ 41.3
Hydrocarbons _____________________ 17.3
  $C_3$ hydrocarbons _______________ 3.5
  Butane ________________________ --
  Butenes _______________________ 2.0
  Vinyl acetylene _________________ 2.7
  1,2-butadiene __________________ 1.1
  1,3-butadiene __________________ 90.5
Rate, lb. mol/hour __________________ 1935

Adiabatic stripper vapor

Composition, mol percent:
N,N-dimethylacetamide _______________ 0.3
Water ____________________________ 4.8
Hydrocarbons _____________________ 94.9
Rate, lb. mol/hour __________________ 252

Adiabatic stripper liquid

Composition, mol percent:
N,N-dimethylacetamide _______________ 47.4
Water ____________________________ 46.8
Hydrocarbons _____________________ 5.8
Rate, lb. mol/hour __________________ 1684

Stripper vapor recycle

Composition, mol percent:
N,N-dimethylacetamide _______________ 0
Water ____________________________ 0
Hydrocarbons _____________________ 100
Rate, lb. mol/hour __________________ 21.2
Total hydrocarbon recycle rate, lb. mol/hour ____ 260

Solvent stripper product

Composition, mol percent:
  $C_3$ hydrocarbons ___________________ 3.5
  Butane _______________________________ ----
  Butenes ______________________________ 2.0
  Vinyl acetylene ______________________ 2.7
  1,2-butadiene ________________________ 1.1
  1,3-butadiene ________________________ 90.5
Rate, lb. mol/hour __________________________ 75.4

Pressures, p.s.i.a.

Extractive distillation column:
  Top _______________________________ 75
  Bottom ____________________________ 85
Adiabatic Stripper ____________________ 20
Solvent Stripper:
  Top _______________________________ 20
  Bottom ____________________________ 25

Temperatures, °C.

Extractive distillation column:
  Top _______________________________ 46
  Bottom ____________________________ 62
Adiabatic stripper ____________________ 52
Solvent stripper:
  Top _______________________________ 106
  Bottom ____________________________ 129

What is claimed is:

1. A process for extractive distillation of a hydrocarbon mixture selected from the group of mixtures consisting of
ethylene and acetylene
propane and propylene
propylene and allene
allene and methylacetylene
butene and butadiene
butadiene and vinylacetylene
pentene and isoprene
ethylbenzene and styrene
cyclohexane and benzene
$C_7$ to $C_9$ paraffins and benzene
$C_7$ to $C_9$ paraffins and toluene
$C_7$ to $C_9$ paraffins and xylene
with a solvent selected from the group consisting of:
saturated ketones of up to about 5 carbon atoms,
saturated N,N-dialkylamides of up to about 5 carbon atoms,
saturated nitriles of up to about 5 carbon atoms,
di-β-chloroethyl ether,
sulfolane,
polyethylene glycol containing from 2 to 4 ethyleneoxy units of the formula wherein $x$ is an integer having a value of from 2 to 4,
which process comprises the following steps:
(a) subjecting said mixture to extractive distillation with said solvent in an extractive distillation zone to thereby extract one of said components from said mixture,
(b) recovering from said extractive distillation zone a solution of substantially said extracted component in said solvent,
(c) subjecting said solution to adiabatic vaporization at a pressure lower than the pressure in said extractive distillation zone whereby at least 10 mole percent of the solute in said solution is vaporized,
(d) recovering said vapors from said adiabatic vaporization step and recycling same to said extractive distillation zone as reboil vapors, and
(e) recovering said extracted component from said adibatic vaporization step.

2. A process according to claim 1 wherein the solvent is selected from the group consisting of acetone, methyl ethyl ketone, N,N-dimethylformamide, N,N-dimethylacetamide, acetonitrile, di-β-chloroethyl ether, sulfolane and polyethylene glycol containing from 2 to 4 ethyleneoxy units of the formula wherein $x$ is an integer having a value of from 2 to 4.

3. A process according to claim 1 wherein the solvent consists essentially of N,N-dimethylacetamide.

4. A process according to claim 1 wherein the solvent consists essentially of N,N-dimethylacetamide and water.

5. A process according to claim 1 wherein the mixture consists essentially of butene and butadiene.

6. A process according to claim 2 wherein the mixture consists essentially of butene and butadiene.

7. A process according to claim 3 wherein the mixture consists essentially of butene and butadiene.

8. A process according to claim 1 wherein step (a) comprises the following steps:
(i) contacting said mixture with said solvent in the absorption section of the extractive distillation zone which is comprised of an absorption section and an enriching section to thereby extract one of said components from said mixture; and
(ii) passing said solvent containing said extracted component from said absorption section into said enriching section
wherein the absorption section is maintained at a higher pressure than the enriching section.

References Cited

UNITED STATES PATENTS

| | | | |
|---|---|---|---|
| 3,242,227 | 3/1966 | Kroeper et al. | 260—681.5 R |
| 2,993,841 | 7/1961 | Sarno | 203—78 |
| 2,415,921 | 2/1947 | Wagner | 203—54 |
| 3,344,198 | 9/1967 | Weitz et al. | 260—681.5 R |
| 3,230,156 | 1/1966 | Katzen | 203—78 |
| 2,901,407 | 8/1959 | Colton | 203—78 |
| 2,779,709 | 1/1957 | Dale et al. | 208—321 |
| 3,133,870 | 5/1964 | Elliott et al. | 203—88 |

WILBUR L. BASCOMB, Jr., Primary Examiner

U.S. Cl. X.R.

203—58, 60, 62, 63, 64, 78, 80, 100; 260—681.5 R

UNITED STATES PATENT OFFICE
CERTIFICATE OF CORRECTION

Patent No. 3,769,217     Dated October 30, 1973

Inventor(s) Ralph R. Bannister et al

It is certified that error appears in the above-identified patent and that said Letters Patent are hereby corrected as shown below:

Column 1, line 7, after "1969", insert -- which is a continuation of abandoned application Ser. No. 477,721, August 6, 1965 - -.

Signed and Sealed this

Twelfth Day of October 1976

[SEAL]

Attest:

RUTH C. MASON
Attesting Officer

C. MARSHALL DANN
Commissioner of Patents and Trademarks